United States Patent [19]

Huang

[11] Patent Number: 5,100,560
[45] Date of Patent: Mar. 31, 1992

[54] APPARATUS AND METHOD FOR SUPERCRITICAL WATER OXIDATION

[75] Inventor: Chiung-Yuan Huang, Glen Ridge, N.J.

[73] Assignee: ABB Lummus Crest Inc., Bloomfield, N.J.

[21] Appl. No.: 708,325

[22] Filed: May 31, 1991

[51] Int. Cl.$^5$ .............................................. B01D 21/00
[52] U.S. Cl. ..................... 210/721; 210/761; 210/747; 210/766; 210/768; 210/396; 210/408
[58] Field of Search ............... 210/678, 768, 177, 721, 210/761, 181, 737, 766, 396, 407, 415, 408, 747, 768, 396; 366/52, 67; 60/39.05

[56] References Cited

U.S. PATENT DOCUMENTS

| | | | |
|---|---|---|---|
| 4,338,199 | 6/1982 | Modell | 210/721 |
| 4,543,190 | 9/1985 | Modell | 210/761 |
| 4,564,458 | 1/1986 | Burleson | 210/748 |
| 4,770,772 | 9/1988 | Kuwajima | 210/408 |
| 4,812,243 | 3/1989 | Brandenburg et al. | 210/761 |
| 4,822,497 | 4/1989 | Hong et al. | 210/177 |
| 4,853,136 | 8/1989 | Roussel et al. | 210/761 |
| 4,898,107 | 2/1990 | Dickinson | 60/39.05 |

FOREIGN PATENT DOCUMENTS 1030695 2/1989 Japan.
0249305 10/1989 Japan.

*Primary Examiner*—Robert A. Dawson
*Assistant Examiner*—Ana Fortuna
*Attorney, Agent, or Firm*—Paul J. Lerner

[57] ABSTRACT

A pressurized feed material (30) in aqueous suspension is oxidized in a supercritical temperature reaction zone (20) in an upper region of a vertically elongated, cylindrical walled, closed pressure vessel (10) to form an oxidized super fluid phase (46) which is removed from the upper region of the vessel and a brine (44) containing precipitates and other solids which are collected in and removed from a subcritical temperature zone (16) in the lower region of the vessel. The wall (12) of the cylindrical pressure vessel (10) is scraped by rotatable scraper means (60) which upon rotation will dislodge precipitated solids from the wall (12).

4 Claims, 2 Drawing Sheets

APPARATUS AND METHOD FOR SUPERCRITICAL WATER OXIDATION

BACKGROUND OF THE INVENTION

The present invention relates generally to the oxidation of a broad spectrum of waste material and, more particularly, to a method and apparatus for the wet oxidation of organic waste, including organic waste having inorganic contaminants such as metals or metallic compounds, at supercritical temperature and pressure conditions, or at supercritical temperatures and elevated, yet subcritical, pressures.

One known method of oxidizing waste material, such as municipal sewage or industrial sludges, commonly referred to a supercritical water oxidation, is disclosed in U.S. Pat. Nos. 4,113,446; 4,338,199; and 4,543,190. In this oxidation method, the waste material is pressurized and fed into a reactor vessel along with compressed oxidant, either oxygen, air or oxygen-enriched air, and maintained therein under supercritical temperature conditions, that is at a temperature above 374° C., and, elevated pressure, to cause rapid oxidation. Under supercritical conditions, water exists in a high-energy, dense-vapor form and is consequently capable of dissolving normally insoluble organics thereby permitting separation from and disposal of inorganic contaminants such as metallic halides, sulfur compounds, light metal elements such as sodium and the like, and heavier toxic metals such as lead, mercury and the like. The end products of the supercritical water oxidation process are carbon dioxide, salt, water and heat.

A commercially practiced method of carrying out supercritical water oxidation, and a reactor vessel particularly adapted therefor, are disclosed in U.S. Pat. No. 4,822,497. As disclosed therein, an aqueous waste stream containing organic and inorganic material is pressurized and fed along with compressed oxygen or air into the upper region of a pressure vessel. This reactor vessel is comprised of two zones: a supercritical temperature zone and a subcritical temperature zone, the subcritical temperature zone being maintained in the lowermost region of the reactor vessel and the supercritical zone being maintained above the subcritical zone. The pressurized feed waste material and the compressed oxidant are admitted via a feed pipe extending into the upper region of the reactor vessel into the supercritical temperature zone. Alkaline material may be injected into the feed stream in order to neutralize any acids formed during the oxidation process. Reaction product gas and effluent from the supercritical temperature zone exit via a nozzle and associated piping. A portion of the effluent is recycled to heat the incoming aqueous waste feed stream, while the remainder of the reactor effluent is cooled, depressurized and discharged in separate gaseous and liquid product streams.

Oxidation of the organics and oxidizable inorganics takes place in the supercritical temperature zone. The material, usually inorganic salt, that is initially present or formed in the supercritical or semicritical fluid phase and is insoluble therein forms dense brine droplets or solid precipitates which inertially impinge on, and fall by gravity into, a liquid phase, still at elevated pressure, provided in the lower temperature, subcritical zone maintained in the lower portion of the vessel. The liquid phase in the subcritical zone provides an aqueous medium for trapping solids, for dissolving soluble materials, and for forming a slurry of insoluble materials. The resultant solution or slurry is removed from the reactor vessel via a pipe opening to the lower region of the vessel.

The inorganic salts which are insoluble in the supercritical or semicritical fluid phase in the reactor vessel may to a lesser or greater extent be tacky, possibly depending on the nature of the feed material and/or operating conditions in the reactor. Organic halogen and sulfur in the waste feed material have been found to react with alkaline material in the feed to form inorganic salts which have extremely limited solubility at supercritical conditions. These insoluble inorganic salts have been known to deposit on the walls of the reactor vessel with the supercritical zone and also on parts of the outlet nozzle from the supercritical zone. Uncontrolled deposition and build up of solids on the reactor vessel wall will require periodic shut down of the reactor to permit flushing and backwashing to remove accumulated solids. As the frequency at which shut down will be necessary will depend on the "tackiness" of the solids, the operating conditions within the reactor vessel, the nature of the waste feed material and likely other conditions, shut downs cannot be predictably planned.

SUMMARY OF THE INVENTION

In a supercritical water oxidation process wherein a pressurized feed material in aqueous suspension is introduced into a supercritical temperature reaction zone in an upper region of a vertically elongated, cylindrical walled, closed pressure vessel and allowed to oxidize therein to form an oxidized super fluid phase which is removed from the upper region of the vessel and a brine containing precipitates and other solids which are collected in and removed from the lower region of the vessel, the walls of the cylindrical pressure vessel are scraped to remove precipitates which deposit on the walls bounding the supercritical temperature zone.

Rotatable scraper means are disposed within the vessel which upon rotation will dislodge the precipitated solids. Most advantageously, the scraper means comprises at least one axially elongated blade means disposed in operative association with the interior wall of the vessel bounding the supercritical temperature zone, and drive means operatively connected to the blade means for rotating the blade means along a circumferential path adjacent the interior wall of the vessel bounding the supercritical temperature zone.

DETAILED DESCRIPTION OF THE INVENTION

Figure 1:
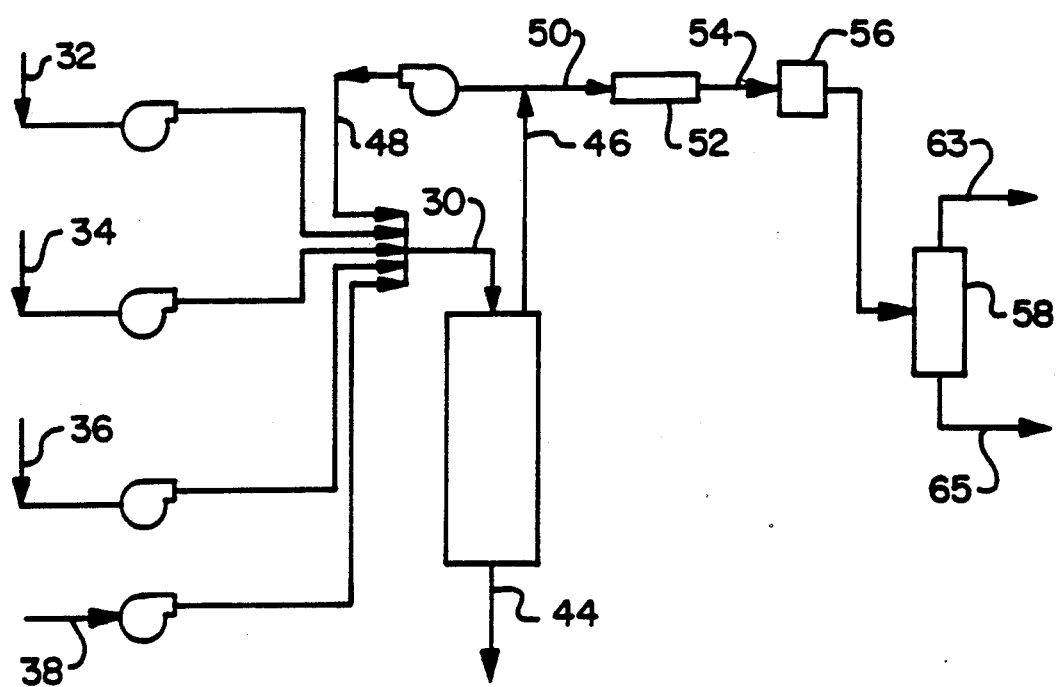
FIG. 1 is a schematic diagram of a waste stream processing system designed to carry out the process of the present invention.

Referring now to FIG. 1, the feed material 30 to be processed is pumped from atmospheric pressure to the desired pressure to be maintained within the reactor vessel. The feed generally consists of organic waste material, inorganics, particulates, sludge, soil neutralizing agents, salt forming agents, and minerals in an aqueous medium 32, and oxidant 38 which is stored as a liquid and later vaporized. Auxiliary fuel 34 may be added if the waste material has a low heating value. Caustic 36 is usually added if any of the organic wastes contain heteroatoms which produce mineral acids and it is desired to neutralize these acids and form appropriate salts. Furthermore, a recycle stream 48 of a portion of the oxidized effluent is also mixed with the feed streams to provide for sufficient heating of the feed and to bring the oxidant to optimum conditions. The combined pressurized feed material 30 is admitted into the oxidizer and separator vessel 10 where it is processed as hereinafter discussed. The resultant brine or slurry 44 is removed and the combusted effluent 46 is split into streams 48 and 50. Stream 48 is recycled as herein discussed while stream 50 is passed on for further processing as desired. For example, the effluent stream 50 may be further treated in a second stage oxidation reactor 52 and the resulting second stage effluent 54 thence being passed through a cooling and heat recovery process 56 before entering a gas-liquid separator 58. The final effluent of gas 63 and water 65 is then de-pressurized and discharged.

Figure 2:
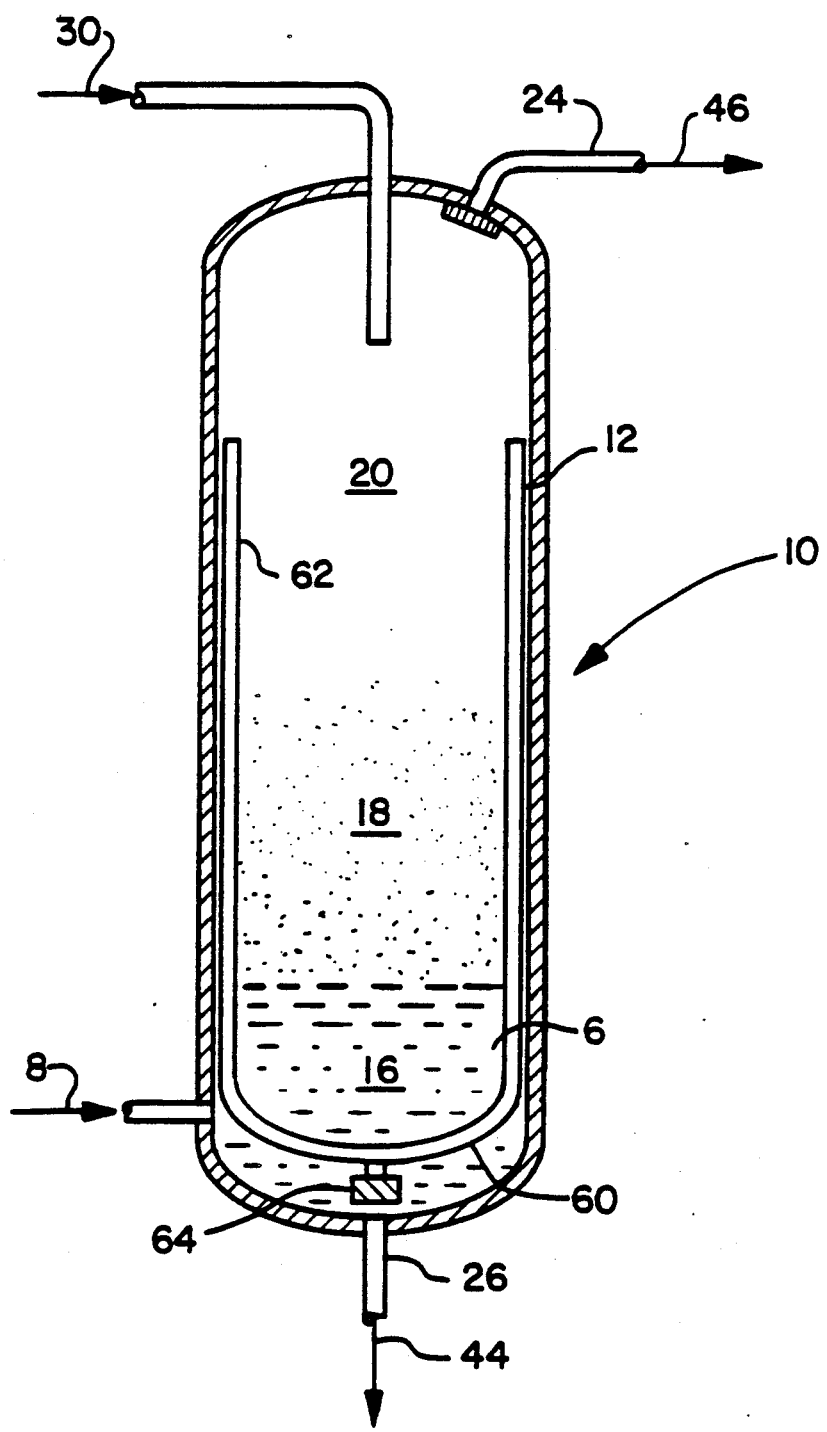
FIG. 2 is a sectional side elevation view of a preferred embodiment of the reactor vessel adapted to carry out the present invention.

The reactor vessel, as depicted in FIG. 2, most advantageously comprises an elongated, hollow cylindrical pressure vessel, capped at both ends so as to define an interior reaction chamber, and designed to be capable of withstanding the high pressures and high temperatures associated with supercritical conditions. Defined within the reaction chamber are a supercritical temperature zone in the upper region of the reactor vessel and a subcritical temperature zone therebelow in the lower region of the reactor vessel.

Oxidation of organics and oxidizable inorganics takes place in the supercritical temperature zone 20 where inorganic materials, present in the feed or formed by chemical reaction, form particulate matter or dense brine droplets by nucleation and gas phase precipitation processes. The supercritical temperature fluid phase flows downward and then reverses flow direction. The combusted effluent exits via a pipe 24 at the top of the vessel 10. Dense matter, such as inorganic material initially present and formed by reaction, which is insoluble in the supercritical temperature fluid continues along the original downward flow path due to a combination of inertia and gravity, and impinges on and falls into the liquid phase 6 provided in the lower temperature subcritical zone 16 of the vessel 10. As shown by the shading in the Figure, there is a somewhat diffuse boundary 18 between the supercritical and subcritical zones.

Pressurized liquid medium 8 such as water or an aqueous solution or mixture may be admitted into the lower region of the vessel 10 to provide the liquid phase and to establish the temperature gradient and concomitant fluid density gradient within the vessel. Alternatively, the admission of pressurized liquid medium into the subcritical zone of the vessel 10 may be omitted if cooling of the lower region of the reactor vessel is provided for, thus allowing condensate to form therein and provide the liquid phase. For example, the lower portion of the vessel may be left uninsulated and allowed to cool, or be externally cooled thereby forming a condensate liquid phase within the sub zone. The liquid phase in the subcritical zone 16 in the lower region of the reactor vessel provides a medium for trapping solids, for dissolving soluble materials which were insoluble in the supercritical zone, and for forming a slurry of insoluble materials. The resultant solution or slurry is removed from the reactor vessel 10 via a pipe 26 opening into the subcritical zone through the bottom of the vessel.

The rate of admission and removal of liquid into and from the subcritical zone may be varied depending on operational requirements. For example, the flow of the liquid admitted into the subcritical zone may be higher than the flow of the resulting solution or slurry from the subcritical zone in order to provide for a variable liquid level within the subcritical zone that would rise up, contact, and trap the various solids and precipitates falling, by inertia and gravity, from the supercritical zone into the subcritical zone of the vessel.

As noted previously, inorganic salts which are insoluble in the supercritical or semicritical fluid phase in the reactor vessel 10 are generally to a lesser or a greater extent tacky. In operation, a certain amount of these tacky solids will migrate to and deposit upon the interior wall 12 bounding the supercritical zone 20 defined within the reactor vessel 10. In accordance with the present invention, the undesirable buildup of such solids on the interior wall 12 bounding the supercritical zone 20 is prevented by scraping the walls to dislodge the solids.

Scraper means 60 is disposed within the reactor vessel 10 for rotation therein about the axis the reactor vessel 10. Scraper means 60 preferably comprises at least one blade member 62, and most advantageously, a plurality of blade members 62, each of which are axially elongated and extend in operative association with the interior wall 12 of the vessel 10 bounding the supercritical temperature zone 20, and drive means 64 operatively connected to the blade members 62 for rotating the blade members along a circumferential path adjacent the interior wall 12 of the vessel 10 bounding the supercritical temperature zone 20. Preferably, the axially elongated blade members 62 extend in operative association with the interior wall of vessel throughout the supercritical temperature zone 20 and into the subcritical temperature zone 16.

Scraper blade members 62 are rotated by drive means 64 at a relatively low speed, typically in the range of one to ten revolutions per hour, thereby ensuring that the entire circumference of the interior wall 12 of the reactor vessel 10 is scraped a number of times per hour. The blade members 62 are also constructed of or coated with a corrosion resistant material, such as a ceramic or a highly corrosion resistant metal alloy.

Although illustrated in the drawing as bottom mounted, it is to be understood that the scraper means 60 may also be top mounted. Additionally, the drive means 64 may be mounted inside or outside the pressure vessel enclosure 10. In any case, the rotation of the blade means 60 will cause the blade members 62 to pass along the interior wall 12 of the vessel 10 dislodging any accumulated deposits which then fall into the brine slurry in the subcritical temperature zone 16 in the bottom of the vessel 10 wherein the solids will dissolve in the cold brine fluid.

What is claimed is:

1. In a supercritical temperature water oxidation process of the type wherein a pressurized feed material including water, organics, inorganics, and oxidant are introduced into an upper region of a vertically elongated, cylindrical walled, closed pressure vessel defining within its interior a supercritical temperature zone in the upper region thereof and a lower temperature zone in a lower region thereof wherein a liquid phase is provided, and allowed to oxidize under supercritical temperature conditions in the supercritical temperature zone to form an oxidized super fluid phase which is removed from the upper region of the vessel and precipitates, said precipitates and other solids passing from the supercritical temperature zone and collecting in the lower temperature zone in an aqueous brine slurry which is removed from the lower region of the vessel, the improvement comprising scraping the surface of at least a portion of the inner wall of the cylindrical wall pressure vessel bounding the supercritical temperature zone so as to dislodge at least a substantial portion of any solids deposited thereon.

2. A supercritical water oxidation process as recited in claim 1 further comprising scraping the surface of the inner wall of the cylindrical wall pressure vessel lying above the subcritical temperature zone so as to dislodge at least a substantial portion of any solids deposited thereon.

3. An apparatus for carrying out the supercritical oxidation of waste material in an aqueous medium, said apparatus comprising:
   a. a vertically elongated, cylindrical walled pressure vessel enclosing a reaction chamber therein having a subcritical temperature zone in a lower region of the vessel and a supercritical temperature zone thereabove;
   b. feed pipe means opening to the reactor chamber for supplying waste material in an aqueous slurry and oxidant into the supercritical temperature zone to react therein to produce a super phase effluent and precipitate solids;
   c. subcritical fluid conduit means opening to the reactor chamber for passing a cold subcritical temperature fluid into the reaction chamber so as to establish a subcritical temperature pool in the subcritical temperature zone in the lower region of the vessel wherein said precipitate solids are collected to form a brine slurry;
   d. first outlet means opening to the reaction chamber for discharging the supercritical phase effluent;
   e. second outlet means opening to the subcritical temperature zone for discharging the brine slurry; and
   f. rotatable scraper means disposed within the vessel for dislodging any deposits of said precipitated solids from the interior wall of the vessel bounding the supercritical temperature zone, said scraper means comprising:
      a. at least one axially elongated blade means disposed in operative association with the interior wall of the vessel bounding the supercritical temperature zone; and
      b. drive means operatively connected to said blade means for rotating said blade means along a circumferential path adjacent the interior wall of the vessel bounding the supercritical temperature zone.

4. An apparatus as recited in claim 3 wherein said axially elongated blade means extend in operative association with the interior wall of the vessel throughout the supercritical temperature zone and into the subcritical temperature zone.

* * * * *